(12) United States Patent
Morsa

(10) Patent No.: US 11,138,614 B2
(45) Date of Patent: *Oct. 5, 2021

(54) NON-ABSTRACT DEVICES, SYSTEMS, AND PROCESSES FOR THE DISPLAY AND FURNISHING OF TANGIBLE BENEFITS

(71) Applicant: Steve Morsa, Thousand Oaks, CA (US)

(72) Inventor: Steve Morsa, Thousand Oaks, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 16/501,079

(22) Filed: Feb. 19, 2019

(65) Prior Publication Data
US 2019/0228421 A1 Jul. 25, 2019

Related U.S. Application Data

(63) Continuation of application No. 15/330,649, filed on Oct. 24, 2016, now Pat. No. 10,482,476, which is a continuation of application No. 09/832,440, filed on Apr. 11, 2001, now Pat. No. 9,576,293.

(60) Provisional application No. 60/211,228, filed on Jun. 13, 2000, provisional application No. 60/196,335, filed on Apr. 12, 2000.

(51) Int. Cl.
| | |
|---|---|
| *G06Q 10/06* | (2012.01) |
| *G06Q 30/06* | (2012.01) |
| *G06Q 30/02* | (2012.01) |
| *G06Q 50/00* | (2012.01) |
| *G06Q 10/10* | (2012.01) |

(52) U.S. Cl.
CPC ......... *G06Q 30/02* (2013.01); *G06Q 30/0282* (2013.01); *G06Q 10/105* (2013.01); *G06Q 50/01* (2013.01)

(58) Field of Classification Search
CPC .... G06Q 30/02; G06Q 30/0282; G06Q 50/01; G06Q 10/105
USPC .................................................. 705/1.1–912
See application file for complete search history.

(56) References Cited

U.S. PATENT DOCUMENTS

| | | |
|---|---|---|
| 4,648,037 A | 3/1987 | Valentino |
| 4,750,121 A | 6/1988 | Halley et al. |
| 4,969,094 A | 11/1990 | Halley et al. |
| 5,224,173 A | 6/1993 | Kuhns et al. |
| 5,249,044 A | 9/1993 | Von Kohorn |
| 5,301,105 A | 4/1994 | Cummings, Jr. |
| 5,553,155 A | 9/1996 | Kuhns et al. |
| 5,584,025 A | 12/1996 | Keithley et al. |
| 5,598,477 A | 1/1997 | Berson |
| 5,696,965 A | 12/1997 | Dedrick |
| 5,717,923 A | 2/1998 | Dedrick |
| 5,740,252 A | 4/1998 | Minor et al. |
| 5,761,648 A | 6/1998 | Golden et al. |
| 5,832,447 A | 11/1998 | Rieker et al. |
| 5,848,396 A | 12/1998 | Gerace |
| 5,852,810 A | 12/1998 | Sotiroff et al. |
| 5,864,822 A | 1/1999 | Baker, III |

(Continued)

FOREIGN PATENT DOCUMENTS

WO WO 200129708 A1 4/2001

*Primary Examiner* — Jonathan P Ouellette

(57) ABSTRACT

Non-abstract devices, systems, and processes for the display and furnishing of tangible benefits in order to permit entities to more effectively make use of targeted benefits from a plurality of benefit providers; where; in preferred embodiments; the benefits are offered to those entities meeting the specified qualifications and eligibility requirements as established by the benefit providers.

43 Claims, 4 Drawing Sheets

(56) References Cited

U.S. PATENT DOCUMENTS

| | | | |
|---|---|---|---|
| 5,884,272 | A | 3/1999 | Walker et al. |
| 5,897,620 | A | 4/1999 | Walker et al. |
| 6,009,413 | A | 12/1999 | Webber et al. |
| 6,014,642 | A | 1/2000 | El-Kadi et al. |
| 6,061,660 | A | 5/2000 | Eggleston et al. |
| 6,067,522 | A | 5/2000 | Warady et al. |
| 6,092,047 | A | 7/2000 | Hyman et al. |
| 6,112,181 | A * | 8/2000 | Shear ............... G06F 21/10 705/7.29 |
| 6,128,663 | A | 10/2000 | Thomas |
| 6,144,944 | A | 11/2000 | Kurtzman, II et al. |
| 6,154,741 | A | 11/2000 | Feldman |
| 6,249,282 | B1 | 6/2001 | Sutcliffe et al. |
| 6,266,648 | B1 | 7/2001 | Baker, III |
| 6,970,922 | B1 * | 11/2005 | Spector ............... G06Q 30/02 709/223 |
| 8,784,198 | B2 * | 7/2014 | Walker ............... G06Q 30/0225 463/29 |
| 2001/0034684 | A1 | 10/2001 | Cushing et al. |
| 2002/0107849 | A1 | 8/2002 | Hickey et al. |
| 2002/0128903 | A1 * | 9/2002 | Kernahan ............ G06Q 30/02 705/14.22 |
| 2006/0069749 | A1 * | 3/2006 | Herz ............... G06F 16/9535 709/219 |

* cited by examiner

NON-ABSTRACT DEVICES, SYSTEMS, AND PROCESSES FOR THE DISPLAY AND FURNISHING OF TANGIBLE BENEFITS

CROSS-REFERENCED TO RELATED APPLICATIONS

The present application is a Non-Provisional Continuation Application which claims priority benefit from U.S. Non-Provisional Continuation application Ser. No. 15/330,649 (incorporated herein by reference); now U.S. Pat. No. 10,482,476 (issued Nov. 19, 2019); filed Oct. 24, 2016 and entitled Non-Abstract Devices, Systems, and Processes for the Display and Furnishing of Tangible Benefits; which claims priority benefit from U.S. Non-Provisional application Ser. No. 09/832,440 (incorporated herein by reference); now U.S. Pat. No. 9,576,293 (issued on Feb. 21, 2017); filed Apr. 11, 2001 and entitled Method and Apparatus for the Furnishing of Benefits Information and Benefits; which claims priority benefit from both U.S. Provisional Application No. 60/196,335 (incorporated herein by reference), entitled Method and Apparatus for the Furnishing of Benefits Information and Benefits, filed on Apr. 12, 2000 and U.S. Provisional Application No. 60/211,228 (incorporated herein by reference), entitled Method and Apparatus for the Furnishing of Benefits Information and Benefits, filed on Jun. 13, 2000. This application is also related to and references Disclosure Document No. 475,569, entitled Method and Apparatus for the Furnishing of Benefits Information and Benefits, filed on Jun. 13, 2000. Steve Morsa as sole inventor of all of the proceeding.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This invention relates generally to a method and system for furnishing benefits and benefits information.

BACKGROUND OF THE INVENTION

Today, many governmental, non-governmental; and other agencies, organizations, groups, associations, companies, enterprises, and individuals (collectively, "benefit providers") offer targeted benefits of various types to those individuals, families, businesses, non-profits and charities, educational institutions and others (collectively, benefit-seeking "entities") whom they deem eligible, qualified and entitled to receive these said targeted benefits. These benefit providers offer all kinds of useful products, services, programs, assistance, information, money & monetary equivalents, and other "things" of value. These benefits include federal, state, and local entitlements like welfare, food stamps, rent vouchers, employment, unemployment, disability, survivor, retirement; property rehabilitation, modernization and retrofitting; government housing, grants and loans to start or grow a business; a reduced cost or free education, free or reduced cost research reports, books and materials, transportation, clothing, counseling, etc. Companies large and small offer discounts, giveaways, free premiums, free merchandise, grants, bonuses, and awards. Additional benefits offered by any number of benefit providers include free or reduced cost legal advice and services; foreclosed real estate; government jobs; police, customs, and other forced sales of personal property; reduced interest-rate real estate financing; reduced or zero down payment real estate loans; tax-sale real and personal property; educational grants, loans, scholarships, fellowships, internships, and awards; free and reduced-cost prescriptions and medical care/treatment; social security benefits; reduced price and financing for cars and other transportation; traveling and vacationing at reduced cost or for free. In total, there are literally 1000's of public and private sources offering an amazingly wide and diverse collection of such targeted benefits.

Entities become very interested in and anxious to acquire these benefits when informed of their existence yet, currently, information about these numerous benefits exist in an extremely fragmented manner and are spread out across a wide range of informational sources, including government books and manuals; public and private sector/commercial books, tapes, CDs, videos, pamphlets, reports, etc. Libraries, bookstores, and government repositories have carried any number of such benefit information resources for some years now. Today, much of this information is even available via the Internet at various government and non-governmental web sites. Yet, as helpful as these books, materials, and web sites can be in the right hands, they all still share a number of significant drawbacks which continues to make it difficult or next to impossible for the intended recipients of these numerous benefits to obtain what is available to them for their use. These problems result in a situation where the potential usefulness of these benefits has been greatly diminished and compromised.

Problem #1 is a lack of one single source to look to for all benefits. Basically, this important information is not located all in one place. To be sure no benefits were being missed would take days and weeks of research in the library; buying and digging through numerous manuals and books (some over 1000 pages long), tapes, CDs, and courses; visiting and researching web sites; and calling numerous government and non-governmental agencies, organizations, and companies; even calling elected government representatives and benefit program administrators. Though the rewards for such efforts are substantial, few have the time, energy, or knowledge needed to undertake such a "benefit trek." As a result, few do.

Problem #2 is best summarized by quoting the large, bold statement appearing on page three of one of the aforementioned benefit information books, "WARNING: THIS BOOK IS OUT OF DATE." This book goes on to explain how information is constantly changing in today's fast-paced world and how as soon as something is published, it is out of date. It's often six months to a year from the time a writer has finished their book until it's available for purchase by the benefit-seeking entity. While this timeline may be acceptable with fiction books, it's a major problem in the case of "benefit-information" books and materials. Benefit programs are modified or discontinued . _ available funds are used up . . . new programs are constantly being created . . . benefit provider contact information changes, etc. By their very nature, it's simply impossible for standard and common printed and audio/visual materials to keep up with such on-going changes.

Problem #3 is a lack of benefit personalization. While a few benefits are available to anyone who requests them, the large majority of benefits—and many of the most valuable— are designed only to fill the needs and desires of entities meeting specified qualifications and eligibility requirements as established by the benefit providers. In the case of an individual and depending on the benefit, such factor(s) could include where that person lives (country, state, county, city, zip code, etc.); whether retired or still working; their sex; renter or owner of their residence; marital/family status; with or without children; race/nationality/ancestry/ethnic origin; citizenship status; investments currently or previously held; current or previous employer(s); potential or actual current business ownership; residency at birth and currently; active or inactive armed forces; year born, occupation; education level; income level; the presence or lack of various physical, mental, health conditions; even the personal preferences of the entity. Books and other materials require the benefit-seeking entity to try and figure out for itself whether or not it may qualify for any particular benefit. Requiring many hours of additional reading and investigation, such efforts can be difficult and frustrating.

Problem #4 is the painfully large fund and resource expenditures made by many of the benefit providers in order to locate and notify their targeted entities of the existence of one or more benefits for which the targeted entity may be qualified for. Benefit providers have only two choices in this regard. Either they can spend little or nothing and hope for the help of the media and others to "get their message out," or they can give up 20% to 50% or more of their valuable funds and resources on advertising and marketing to try and reach their targeted entities. Both options are inherently problematic; yet both are all too common, negatively impacting both the benefit providers and their targeted entities.

There is a need to provide easily accessible product/service/value benefit information (and—particularly in the case of "cash equivalents" such as vouchers, certificates, and the like—the benefits themselves) being offered by multiple benefit providers in real time to targeted entities; which said entities would otherwise find very difficult and time-consuming to locate and utilize. In this age of often daily benefit fluctuations, it is advantageous to a potential entity to be able to have accurate, real time information concerning benefit availability. As benefits availability and their respective terms, conditions, and eligibility requirements fluctuate, the importance to the entity of being able to respond to these fluctuations on a timely basis increases.

An entity could then decide in real time whether to apply for and utilize one or more available benefits while they are still available to said entity.

Accordingly, it would be desirable to provide a system whereby government and non-government product, service, program, assistance, information, value, and other benefit providers could supply their benefits in a manner which allows qualifying entities to more advantageously make use of such benefits. It is a further object of this invention to supply benefit providers with a marketing medium whereby entities seeking specific benefits may be made aware of modifications to benefits, discontinuances of benefits, and the availability of new benefits; all on very short notice; done automatically via a plurality of various "instant messaging/notification" devices/instrumentalities.

BRIEF SUMMARY OF THE INVENTION

The present invention is designed to provide an entity with real time benefit information, from a variety of benefit providers, in a format that is understandable and informative. The present invention is unique in that never before has there been a network system that conducts a search of multiple sources of benefit information, in substantially real time, and presents the results to the user in one organized presentation.

The present invention is a sophisticated computerized system by which gathered benefit information from a plurality of benefit providers may be electronically connected to a computer network. Value added software is provided at the network to assimilate the data collected from various and multiple benefit providers in substantially real time, to place the data in an understandable format for preferably a single presentation to the benefit seeking entity. The entity receives the assimilated data from the various and multiple benefit providers through an electronic connection (via modems) between the entity's computer and the network A program on the entity's computer can capture the formatted data supplied by the network and prepare it for display or analysis. In an alternate configuration the benefit providers are electronically connected to a regional host. The regional host is then electronically connected to the computer network. The system of the present invention has many advantages over known benefit acquisition methods.

First, the present invention offers a "real time" picture of available benefits from multiple and varied benefit providers. Second, the present invention allows the display in "real time" of only those benefits for which an entity is (or appears to be) qualified to receive. Third, the present invention allows benefit providers to reduce or eliminate the often substantial costs of bringing their benefits to the attention of those entities qualified to receive them. Fourth, the present invention offers the capability to an entity of acquiring various benefit providers' benefits information, the benefit provider contact information, and the actual benefits themselves; all in one understandable and usable format that is currently not available via other methods.

A system and method is also disclosed for allowing an entity to discover what benefits said entity would be qualified to receive if entity data contained one or more inaccurate, "phantom" data factors, e.g., an incorrect current entity location; which could help entity to decide whether or not to relocate to a new city, state, area, country, etc.; entity's decision of whether or not to move then wisely based at least in part on the benefits available to entity at the contemplated new location.

A method according to this alternate embodiment includes: (1) creating an alias location record based on the new location entity is contemplating moving to; and (2) making available the resultant alias benefit information for entity's viewing.

A system and method is also disclosed for allowing an entity to discover what benefits an entity other than said entity is qualified to receive. An example of this would be an adult man whose mother is blind, infirm, or otherwise unable to make use of the system on her own. By allowing the son to input the needed entity data of his mother, the potentially important and valuable benefits for which the mother qualifies for can be readily obtained.

A method according to this alternative embodiment includes: (1) creating an alias set of entity data based on someone other than a given entity; and (2) making available the resultant alias benefit information for given said entity.

The use of other phantom entity data in this or similar manners will reveal additional benefit information which will also prove useful and valuable to entity.

Further aspects of the present invention will become apparent during the course of the following description and by reference to the attached drawings.

DETAILED DESCRIPTION OF THE INVENTION

Reference will now be made in detail to an implementation of the present invention illustrated in the accompanying drawings. Wherever possible, the same reference numbers will be used throughout the drawings and the following description to refer to the same or like parts.

Standard components preferably include conventional computers; telecommunication and data communication services; and input and output devices such as telephones, computer terminals, printers, and facsimile machines. The architecture for and procedures to implement data handling among these machines, however, are not conventional, as they provide for distribution of benefit information and benefits.

Figure 1:
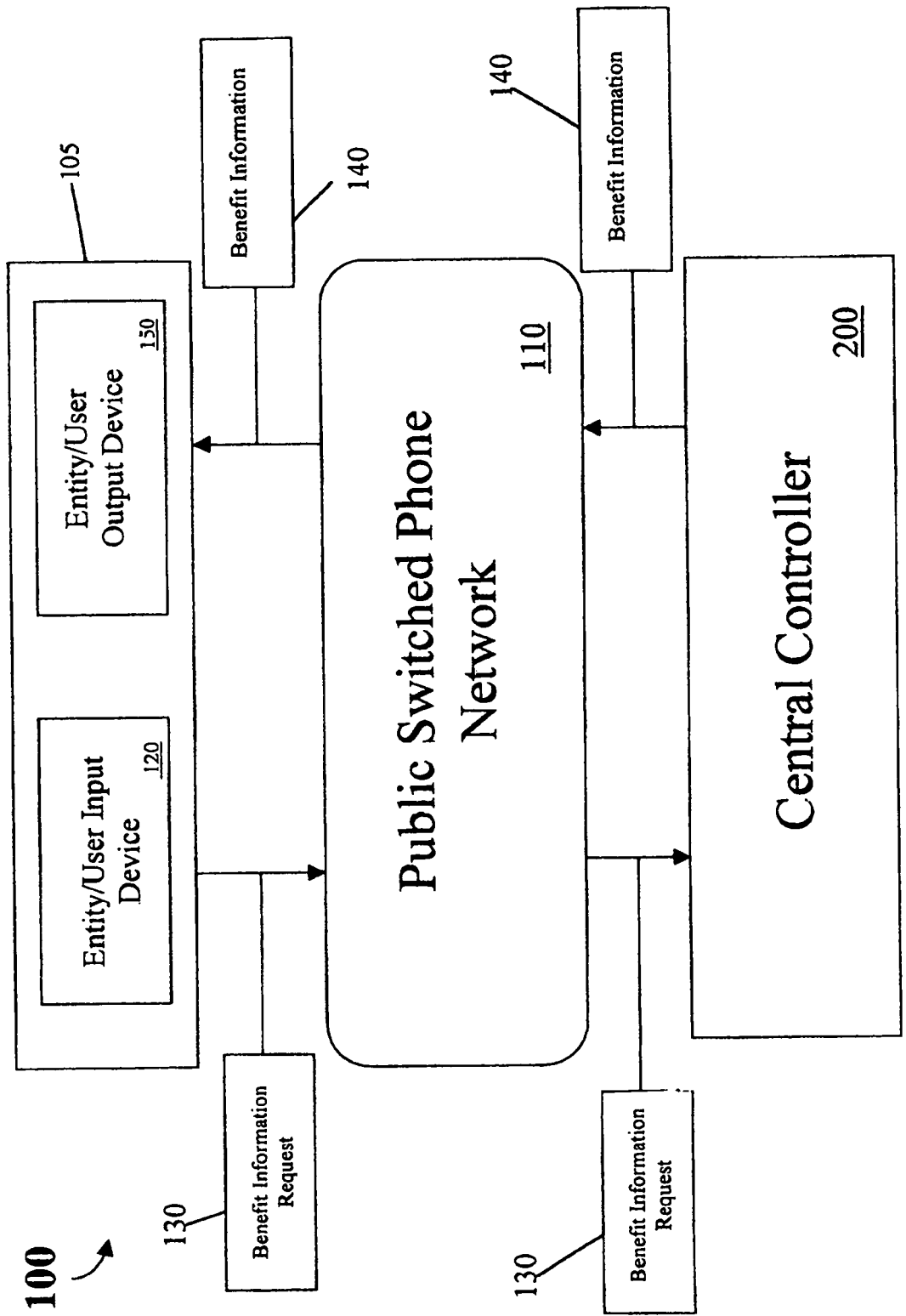
FIG. 1 is a block diagram of a benefit information distribution system according to an implementation of the present invention.

According to the present invention, a computerized system is shown in FIG. 1 which permits entities to more effectively make use of a variety of available benefits from a plurality of goods, services, information, and value benefit providers.

As used herein, the term "benefits" shall be understood to mean any discounted rate or any other added value available to an entity in addition to those otherwise offered to the general public, businesses, non-profits and charities, governments, educational institutions families, and any other entities. "Entities" shall be understood to mean individuals, businesses, non-profits, charities, governments, educational facilities, and families; including any and all other agencies, groups, organizations, enterprises, etc.; and also including two or more of any of these entities acting together and in concert with one another.

The invention allows entities to make advantageous use of such benefits offered by benefit providers by correlating the specific benefits offered with the demographic, geographic, psychographic, and preference data for each entity.

FIG. 1 is a block diagram of benefit information distribution system 100 according to an implementation of the present invention. As illustrated, system 100 includes user location 105, public switched telephone network 110, and central controller 200. User location 105 includes a user input device 120, which, as illustrated, may be a computer. User location 105 also includes a user output device 150, which, as illustrated, may be a computer terminal. Those skilled in the art will recognize that user input device 120 may be any electronic input device connectable to central controller 200, such as a telephone, facsimile machine, TV with set-top box (Web TV, etc.), cell phone, PDA, or a touch-screen display or other graphical user interface (GUI) for connecting to central controller 200 via public switched telephone network 110. Similarly, user device 150 may be any type of output device such as a printer, facsimile machine, TV, cell phone, PDA, etc. Output device 150 also represents an e-mail address, website, or the like, to which central controller 200 may send requested information. Although a single user input device and single user output device is shown in FIG. 1, it is to be understood that any number of user input devices and user output devices could be coupled to an appropriate central controller 200. It is to be additionally understood that input device 120 and output device 150 may be one in the same device as in the case of a computer, telephone, cell phone, PDA, etc.

Public switched telephone network 110 is a conventional public switched telephone network of the type operated by telephone companies like AT&T, MCI, General Telephone Sprint, etc.

Lastly, central controller 200 includes a conventional server computer system that responds in near real time to requests for stored information. Central controller 200 also executes software to store and manage benefit information related to benefit providers; and to distribute the stored information upon request.

As shown in FIG. 1, an entity/user transmits a request using user input device 120. The request initiates a process to locate, retrieve, and transmit to the entity/user benefit information which entity qualifies to take advantage of.

Central controller 200 receives the user's request via public switched telephone network 110. Central controller 200 determines whether any benefit information 140 corresponding to the received benefit information request 130 exists. If so, central controller 200 retrieves the requested benefit information from a benefit information database, and sends the retrieved benefit information 140 to a user-specified location, such as user output device 150. Those skilled in the art will recognize that user input device 120 and user output device 150 may be at different locations, in which case the request transmitted to central controller 200 would include an identity and/or location of user output device 150 to which benefit information should be sent. Additionally, as discussed below, users pre-register with central controller 200 before it will provide requested benefit information. As part of the registration process, the users may specify a preferred output device to which central controller 200 will transmit any requested benefit information.

Figure 2:
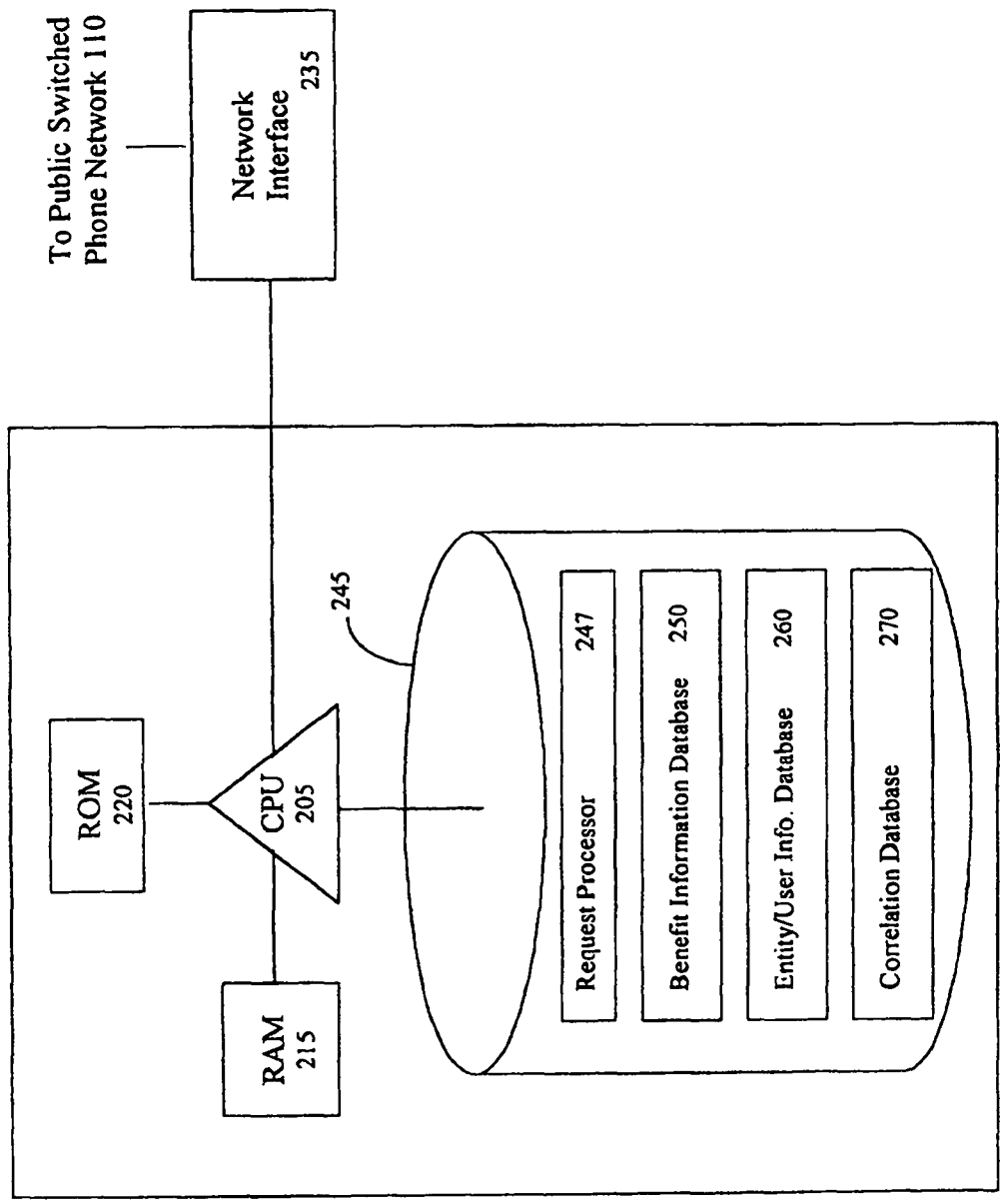
FIG. 2 is a block diagram of the components of a central controller used by the benefit information distribution system of FIG. 1.

FIG. 2 is a block diagram of the components of central controller 200. Central controller 200 is connectable to a conventional network interface device 235, to connect central controller 200 to public switched telephone network 110. At the heart of central controller 200 is CPU 205. CPU 205 connects to RAM 215, ROM 220, and storage device 245. CPU 205 represents one or more suitable microprocessors (such as the Pentium® processor manufactured by Intel Corporation) or other electronic processing unit as is well known to those skilled in the art. RAM 215 and ROM 220 are also conventional. CPU 205, RAM 215, and ROM 220 are used in conventional ways to process requests for benefit information in accordance with stored instructions, i.e., computer software.

Storage device 245 is a conventional mass storage device such as a hard disk. It may also include multiple mass storage devices, including both read-write devices and write-once read many times devices like optical disk drives or other suitable medium. Storage device 245 includes a request processor 247 and multiple databases 250-270.

Request processor 247 constitutes computer software executed by CPU 205 for processing the requests for benefit information. Using information maintained by databases 250-270, CPU 205 processes requests for benefit information in accordance with instructions of request processor 247.

Storage device 245 also includes a benefit information database 250, an entity/user information database 260, and a correlation database 270. Databases 250-270 may include various types of database structures. The preferred database structure is a relational database because it provides rapid responses to requests for benefit information.

In general, benefit information database 250 stores benefit information offered by a plurality of goods, services, information, and value benefit providers. It generally includes a list of the certain specific governments, agencies, organizations, companies, etc. which are making available one or more certain specific benefits for targeted entities/users. Database 250 benefit information may be (1) gathered via phone, mail, FAX, e-mail, an internet, web sites, etc. from the benefit providers and/or (2) inputted directly into database 250 through electronic or other means by the benefit providers themselves and/or (3) gathered from or inputted directly by some other third-party intermediary acting on behalf of the benefit providers. Entity/User information database 260 contains demographic, geographic, psychographic, and preference data information on entity/users who have registered to receive benefit information. Lastly, correlation database (or sub-database) 270 contains detailed specific information for each benefit offered by each benefit provider that permits CPU 205 to, (1) determine whether a particular benefit is or may be available for the possible use by a particular entity, and (2) to readily retrieve correlation data for a specifically identified benefit. It is to be understood that any suitable electronic or other suitable means can be utilized for coupling CPU 205 to ROM 220, RAM 215, storage device 245, and network interface 235.

Significantly, in a preferred embodiment, the system is particularly advantageous in that it does not need and can be designed to omit generally unpopular, privacy-invasive entity/user identification information in order to provide the desired benefit information to entity/user. In such a preferred embodiment, the benefit information desired by user is readily supplied without user's name, social security number, street address, and other such "private" information being revealed by the entity/user. Alternatively, some or all of this "private" information may be required in order to obtain at least some of the entity/user desired benefit information and/or the benefits themselves.

The various hardware requirements for the system as described herein can generally be satisfied by any one of many commercially available high speed personal computers offered by companies such as Dell, Compaq, IBM, or Apple. The specific electronic and magnetic hard drive memory requirements for the system depend upon the volume of benefits to be tracked by the system as well as the number of entity users. Likewise, processing speed can be chosen to provide a suitable combination of speed and cost effectiveness for the anticipated demands to be placed upon the system. Alternatively, any other type of computer with sufficient processing speed and memory capability can also be used for the purposes of the invention In a preferred embodiment, the system can be designed to operate with any specifically chosen computer operating system such as Windows, MS DOS, Linux, UNIX, MAC OS, etc. In this regard, it should be understood that the system as disclosed herein is an "application program" which can be designed to operate with practically any conventional and commercially available computer operating system. Further, the system as designed herein can be implemented by any programmer of ordinary skill in the art using commercially available development tools for the operating systems described above.

It should be understood that the specific input data required to obtain benefit information can be varied as necessary, provided such data is sufficient to allow processor 205 to accurately obtain correlated benefit data. Information relating to entities, benefits, benefit providers, and correlation data may be arranged in storage device 245 in any convenient format or form. Suitable data structures and search routines for accomplishing this purpose are well within the knowledge of those of ordinary skill in the art. Any suitable data structures and search routine may be used, provided that it enables processor 205 to search for and locate correlated benefit information applicable to a specific entity/user.

Accordingly, no attempt shall be made herein to describe all of the various organizational methods and programming techniques by which such information can be arranged and retrieved. Instead, FIG. 2 merely shows one possible example of a manner in which the information could be organized for use in connection with the invention.

In a preferred embodiment, the system is capable of identifying benefit information formatted such that the user's benefits are listed under specific classes or categories such as: "Housing," "Education," "Medical," "Employment," "Travel," "New (benefits)," etc. Alternatively, the benefits may be listed according to their value to the user, the costs (if any) to utilize the benefits, ease of use of the benefits, expiration dates of the benefits, physical proximity of the user to the benefit providers, etc.

Figure 3:
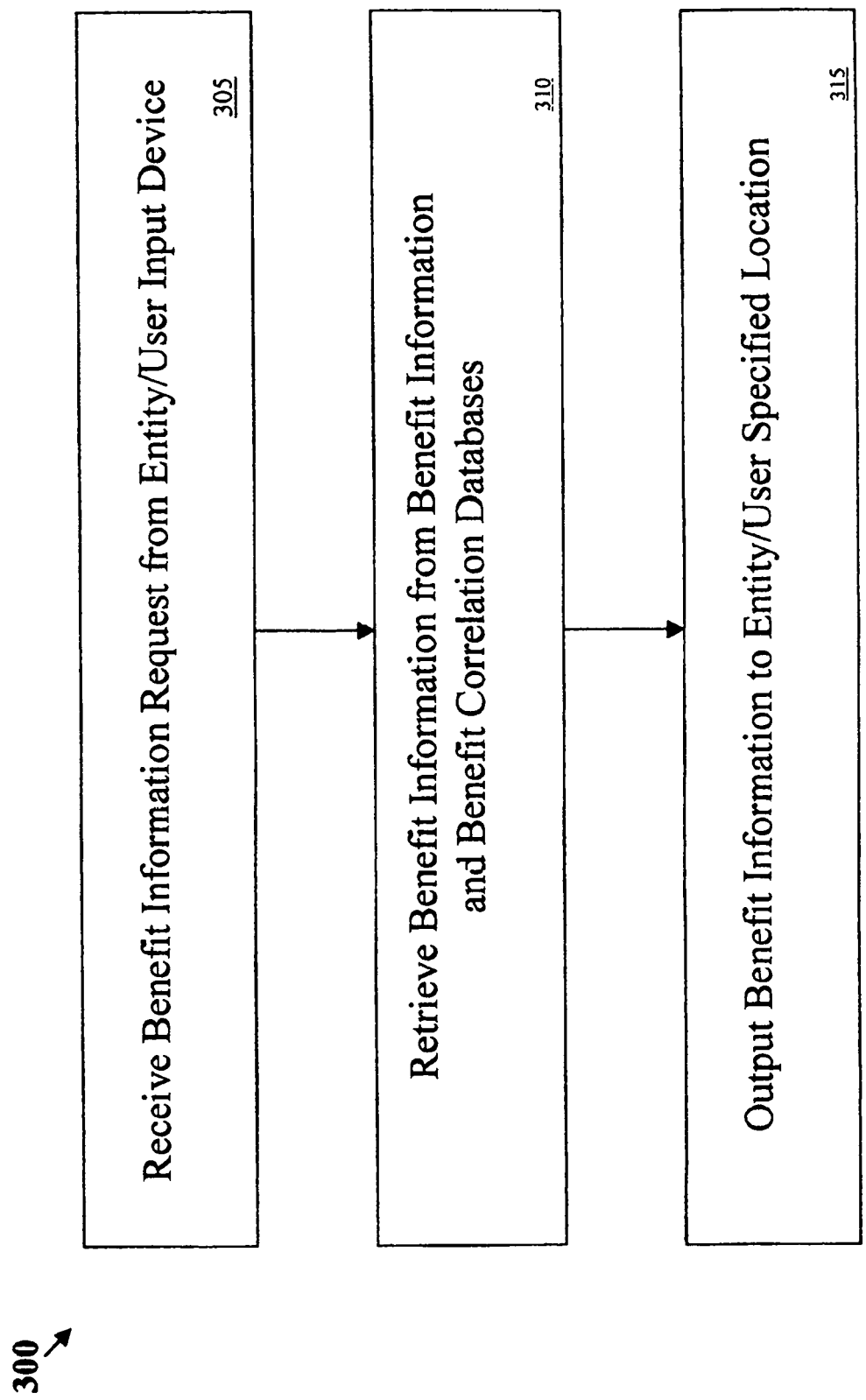
FIG. 3 is a flow chart of an operation of the benefit information distribution system to process requests for benefit information.

FIG. 3 is a flow chart of the general procedure 300 used by central controller 200 to provide benefit information using databases 250-270. Central controller 200 first receives a request for benefit information from a user input device such as a computer or telephone (step 305). Central controller 200 uses the input information to retrieve any benefit information from benefit information database 250 and benefit correlation database 270 (step 310). Central controller 200 then outputs the located benefit information to a specified user output device (step 315). The output device may be specified by the user as part of the initial request for benefit information or an output device specified for the user in user information database 260. Further, central controller 200 charges user's credit or debit card(s) and updates billing information in user information database 260 to reflect the "purchase" (transmission) of requested benefit information.

It is to be understood that numerous other alternative charging/billing and income-generation methods may be used without detracting from the scope of the present invention, e.g.; supported by users via periodic subscription ("X" dollars per month, per year, etc.), flat-fee per use, per time interval (by the minute, hour, etc.), per benefit(s) received, a percentage of benefit(s) utilized, "900" caller/user pay phone number, etc.; and/or supported via one or more of the benefit providers on a per benefit viewed, per-benefit utilized basis, etc.; and/or supported via common online/offline advertising and marketing revenue sources; optionally including ads and marketing messages placed within the body of personalized/customized printed, electronically stored, etc. benefit information "storage" devices (books, CDs, floppy disks, hard drives, etc.). Alternatively, one or more benefit information listings and/or benefits and/or access to one or more entity/users and/or access to one or more benefit providers could be made available at no cost to one or more of the benefit providers and/or at no cost to one or more of the entity/users.

Suitable revenue structures and income generation methodologies for use in conjunction with the present invention are well within the knowledge of those of ordinary skill in the art. Accordingly, no attempt shall be made herein to describe all of the various income generation and charging/billing techniques which may be used in conjunction with the present invention.

Figure 4:
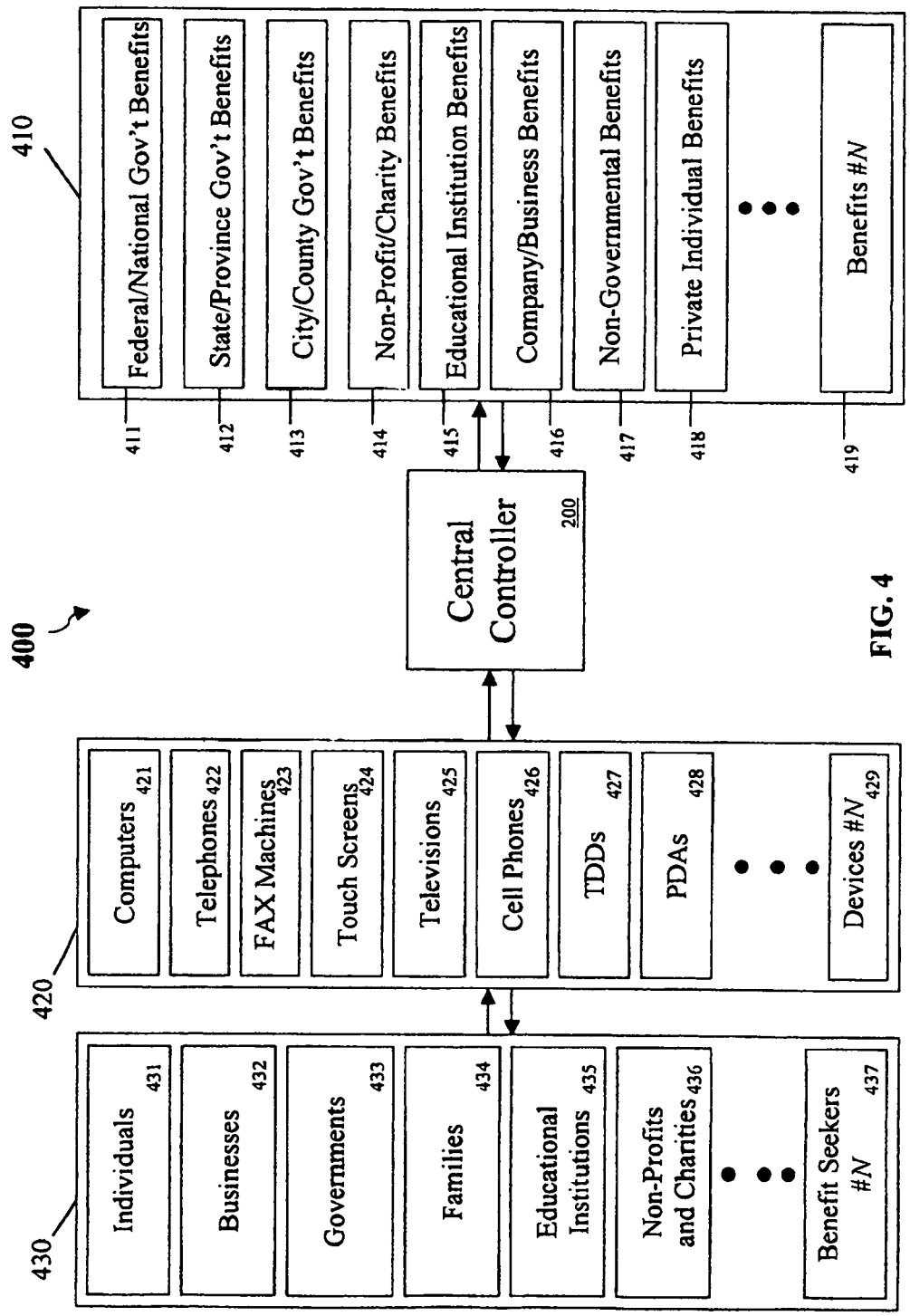
FIG. 4 is a block diagram of the components of a benefit-information/benefit acquisition and distribution system according to an implementation of the present invention.

FIG. 4 is a block diagram of the components of a benefit-information/benefit acquisition and distribution system 400. As shown in FIG. 4, central controller 200 may receive a plurality of benefit information from a plurality of benefit providers (operating from a plurality of locations) 410. These 411-419 benefit providers are shown listed by class ("Federal/National Gov't 411," "State/Province Gov't 412," "City/County Gov't 413," etc.), but may also include any entity of any form or type which is offering one or more targeted benefits to one or more benefit seeking entities. Central controller 200 may be further connected by electronic or other means to a plurality of user input/output devices (operating from a plurality of locations) 420. These 421-429 devices may be of the type shown ("Computer 421," "Telephone 422," "FAX machine 423," etc.), but may also include any device capable of allowing the system user to input the requisite entity data and receive the resultant benefit information output; optionally including said output to printing-enabled devices for the creation of a customized/personalized physically printed (report, book, etc.) or electronically printed (floppy-disk, CD, etc.) or electronically or otherwise stored (within a computer hard drive, etc.) permanent record of said benefit information. A plurality of benefit-seeking system users (located in a plurality of locations) 430 may be listed by "entity type" as shown in FIG. 4 ("Individuals 431," "Businesses 432," "Governments 433," etc.); but these benefit-seekers 431-437 may also include any entity type desiring to discover what, if any, benefits said entity qualifies for.

In one embodiment, the system is capable of allowing benefit provider(s) 410 to, where practicable, deliver their benefits directly through central controller 200 to benefit-seeking users 430 via printing-enabled input/output devices 420. Generally, this is possible when the benefits provided include checks; monetary equivalents such as food stamps, certificates, coupons, rebates and the like; as well as "informational"-type benefits such as reports, books, etc.; and including floppy disks, CDs, etc. (where the benefit can be transmitted to and stored electronically).

It is to be understood that where terms such as "Federal," "State," "City," etc. are used in 410 in relation to governments that equivalent terms depending on the government entity(ies) applicable to a given system user are also included in the invention.

In another embodiment, central controller 200 may be utilized to assist system user 430 in obtaining one or more of the benefits 410 user qualifies for. This could include supplying any application or other forms required by the benefit providers in order to receive their offered benefits, assist in the completion and submission of said forms, etc. Such assistance is likely to further increase the already obvious advantages the present invention offers.

In a preferred embodiment, the system includes means to notify system users, via suitably enabled input/output devices 420, of any modification or elimination of existing benefits; or the availability of any new benefits; or the pending modification or elimination of existing benefits or pending availability of new benefits. In this way users 430 will be constantly kept up to date on the benefit(s) or benefit class(es) most important to them.

Another significant advantage of the present invention, besides the above obvious benefits, is the opportunity for the above-described system 100 to itself become a benefit provider. It may do so by having the system operator negotiate directly with benefit providers to offer their benefits to the system's entity/user database.

Thanks to the relatively short lead times required, an additional further advantage of the system is its ability to offer and provide benefits which may be created on short notice simply by adding the benefits and their corresponding correlation information to central controller 200. This would enable both benefit providers and benefit seekers to take advantage of short-term opportunities and changing conditions. As an example, a city government might realize that a first-time homebuyer loan program they're offering is about to expire with unused funds still in the account.

The city could liberalize the terms/conditions of the loan program sufficiently to quickly induce, especially by utilizing the above described user update notification system, a sufficient number of additional buyers to use up the remainder of these targeted funds. This advantage of the system reveals another related advantage of the system; namely that benefit providers are now able to, when desired, "fine tune" the amount of—and rate of use of—their benefits simply by varying the terms and conditions of their benefits as needed in order to better meet the intentions and disbursement goals set for these benefits. Again using the above city loan program example; if the funds were still not being used up quickly enough with the first interest rate cut, the city could reduce the interest rate another ½% and/or reduce the associated loan fees in order to induce even more buyers to quickly utilize the city's loan program. Through this marketplace-sensitive, quasi- "benefit-auction" use of the system, the common problems of "left over money/benefits" and "more qualified benefit seekers than money/benefits available to supply them" can effectively be remedied.

Example

An example of the present invention in use for a given entity will help better explain the unique aspects of the invention. In this brief scenario, the entity is an individual named "Dawn," an Internet surfer who has recently signed on the service provided in accordance with the present invention and who now is seeking to find out what benefits she is entitled to receive. Dawn logs her computer onto the network host utilizing interface management software provided by the network host (or dials into system via her telephone). Dawn then completes a personal profile questionnaire asking her for demographic, psychographic, geographic, and preference data. These may include such questions as Dawn's city or zip code, her income, marital/familial status, education, housing (renter, owner); type of housing: apartment, single-family home, co-op, townhome; birth date, nationality, occupation, any medical conditions or health needs, etc.; as well as her personal hopes, dreams, and interests/preferences.

Upon her submission of this profile (e.g., by "clicking" on the indicated "submit request" or similar icon; or via telephone by speaking with a live "operator," or via an interactive voice response unit [IVUR]), etc., the interface formats these parameters and transmits her request for benefits to the network host. The network host, through network software, accesses the network database(s); which is (are) updated in substantially real time with previously gathered benefit information concerning various benefits available from various benefit providers. The network host then processes the information into a usable protocol that enables the entity interface management software to provide the data to Dawn in an appropriate presentation. Dawn's computer (or telephone, FAX machine, etc.) then receives the processed information from the network host and displays the benefit information for her in real time.

For example, the benefits she qualifies for could include a zero-down payment, first-time home-buyer program offered by her city or state (helpful since she's tired of renting and is getting married soon), printing off the loan application and accompanying city certificate for her probable use; a possible job with the city fire department (could be an interesting career); an SBA micro-loan program for women entrepreneurs (maybe starting her own business is the way to go) an internship at the local college (in case she wants to further her education), the in-depth details of which she carefully reviews on her computer screen; a promising new treatment for Alzheimer's disease (good news for her elderly father), information about which she e-mail forwards to her dad; notice of an upcoming customs sale (Dawn's heard there's some real money to be made reselling that stuff); a great deal at the local music store on a new piano (she's always wanted to take lessons); a federally-sponsored program that buys up old "clunker" cars to reduce air pollution (her smog-belching car is on its last legs); a reduced-rate, new-car loan program available from the local car dealership for recent college grads (she'll have to replace her clunker somehow), details about which she stores to a floppy disk; federal prescription program for the infirm (something her aunt could really use); a local program to help working single moms afford quality daycare for their kids (the kind of program her sister really needs), the state voucher for which she prints off and gives to her sister; notice of next month's upcoming county tax defaulted real estate sale (to go along with her zero down home loan), which list of properties Dawn stores to her hard drive; and a "two-for-one" ticket sale at the local opera (could be just the incentive needed to get Dawn's fiancé to at least give opera a chance), the coupon for which she prints off to take with her to the opera house.

Optionally, Dawn may request real time updates of the benefit information via such means as e-mail, FAX, pager, hard-line or web-enabled phone, PDA (Personal Digital Assistants such as the Palm®), etc. Then, the benefit information applicable to her will be automatically updated as the information gathered from the benefit providers is updated. Such updates may also occur as, for example, due to the passage of time as when Dawn reaches various ages; since a number of benefits are generally known to be at least partially age-based. In addition, Dawn's profile may be adjusted and updated from time to time by Dawn and/or the system operator. The result is that Dawn has real time or near real time access in a readily understandable format, on a single display screen (or other single "benefit touch point") of all the benefits for which she is qualified to receive. Regardless of the source(s) of those benefit(s).

The service provided by the present invention can be offered with a variety of entity-pay and/or benefit providers-pay and/or advertisers/sponsors-pay options; or can be offered free to the entity and/or free to one or more of the benefit providers.

The many features and advantages of the present invention are apparent from the detailed specification, and thus, it is intended by the claims to cover all such features and advantages of the invention which fall within the true spirit and scope of the present invention.

While the invention has been described in connection with what is presently considered to be the most practical and preferred embodiment, it is understood that the invention is not to be limited to the disclosed embodiment. This description is not intended to be exhaustive or to limit the invention to the precise form disclosed. For example, although the preferred instantiation of the equipment or "viewer" the entity/user uses to communicate with comprises a general-purpose desktop computer or the like, other equipment (e.g., a television with set-top box, telephone, FAX machine, or a dedicated display device) could be used instead. Moreover, although the preferred instantiation of the "viewer" is connected to the other components of system 100 via the public switched phone network 110, other forms and sub-forms of connection (e.g., an interne, cable TV, satellite/electronic broadcast, on-line systems, local-area networks, wide-area networks; as well as via physically distributed and individualized/personalized "books," "floppy" disks, CD-ROMS, etc.) are also readily supported.

The present invention thus provides a practical and economically feasible system for benefit providers to provide their benefits to those targeted entities qualified/eligible/entitled to receive them; while at the same time allowing benefit seekers to finally have access to (and optimally, to use) up to all the many benefits for which they're qualified/eligible/entitled to receive. This is accomplished by providing both benefit providers and benefit seekers with a simple means and mechanism to more quickly, easily, and efficiently come together for the mutual benefit of both.

Furthermore, since numerous modifications and variations will readily occur to those skilled in the arts once this invention is known to the arts, it is not desired that the present invention be limited to the exact construction, operation, and implementation illustrated and described herein, and accordingly, all suitable modifications and equivalents which may be resorted to are intended to fall within the spirit and scope of the claims.

What is claimed is:

1. A technology and computing improving, tangible, non-abstract benefit system comprising:
   receiving in at least one physical memory device and via a network (i) at least a sub-set of an entity's demographic, geographic, and psychographic data, (ii) benefit data for a benefit which is offered to one or more entities meeting the specified qualifications and eligibility requirements as established by a benefit provider, and (iii) the benefit provider's data;
   storing in at least one physical memory device (i) the entity's data, (ii) the benefit data, and (iii) the benefit provider's data;
   inputting at least the entity's data and the benefit data into a processing device with at least one data entry device in electronic communication with the processing device;
   said processing device analyzing at least (i) the entity's data and (ii) the benefit data in real or substantially real time to determine whether the entity qualifies for the benefit provider's benefit;
   generating a message to a web-enabled mobile device to inform the entity of the availability of the benefit;
   anytime thereafter, receiving data indicating that entity is at a different geographic location;
   generating a new message to the web-enabled mobile device to inform the entity of at least one different benefit which was not previously but is now available to entity due at least in part to entity's different geographic location;

wherein at least one of the first, initial benefit and the second, different benefit is/are from the group consisting of: rebate, voucher, certificate, discount, giveaway, free premium, free merchandise, grant, bonus, award, free or reduced cost legal advice and/or services, reduced interest-rate real estate financing, reduced or zero down payment real estate loan, reduced price and/or financing for cars, traveling and/or vacationing at reduced cost or for free;

wherein geographic location is provided by the entity;

wherein at least one of the benefits carries an expiration date;

wherein at least one of the benefit providers pays each time their benefit is utilized;

wherein the benefit provider is notified of the acceptance of the benefit.

2. The technology and computing improving, tangible, non-abstract benefit system of claim 1, wherein the entity pays to receive at least one of the benefits.

3. The technology and computing improving, tangible, non-abstract benefit system of claim 1, wherein one or more of the entity's demographic, geographic, and psychographic data is phantom data.

4. The technology and computing improving, tangible, non-abstract benefit system of claim 1, wherein the web-enabled mobile device is a web-enabled phone.

5. The technology and computing improving, tangible, non-abstract benefit system of claim 1, wherein a map and/or directions to at least one benefit provider is generated to the entity's web-enabled mobile device.

6. The technology and computing improving, tangible, non-abstract benefit system of claim 1, further comprising the availability of a communication connection between at least one benefit provider and the web-enabled mobile device.

7. The technology and computing improving, tangible, non-abstract benefit system of claim 1, wherein at least one of the benefits is printable.

8. The technology and computing improving, tangible, non-abstract benefit system of claim 1, wherein the web-enabled mobile device is a touch screen web-enabled mobile device.

9. The technology and computing improving, tangible, non-abstract benefit system of claim 1, wherein at least one benefit is shared with at least one other entity via the system.

10. The technology and computing improving, tangible, non-abstract benefit system of claim 1, wherein, through the aggregation of the entity with at least one additional entity, all the aggregated entities qualify for an improvement in the terms and/or conditions of at least one benefit.

11. The technology and computing improving, tangible, non-abstract benefit system of claim 1, further including entity identification data.

12. The technology and computing improving, tangible, non-abstract benefit system of claim 1, wherein at least one benefit provided by at least one benefit provider is received directly into the system.

13. The technology and computing improving, tangible, non-abstract benefit system of claim 1, wherein at least one benefit provided by at least one benefit provider is received into the system from a third-party intermediary acting on behalf of at least one benefit provider.

14. The technology and computing improving, tangible, non-abstract benefit system of claim 1, wherein geographic location is determined using a wireless local area network (WLAN) instead of being provided by the entity.

15. A web-enabled mobile device comprising a graphical user interface (GUI), the mobile device being configured to:
display on the GUI a benefit, wherein the benefit is displayed based at least in part on (i) one or more of the demographic and/or psychographic criteria data of an entity and (ii) the physical proximity of the web-enabled mobile device to a benefit provider;

wherein the benefit is offered to one or more entities meeting the specified qualifications and eligibility requirements as established by the benefit provider;

wherein the benefit is from the group consisting of: rebate, voucher, certificate, discount, giveaway, free premium, free merchandise, grant, bonus, award, free or reduced cost legal advice and/or services, reduced interest-rate real estate financing, reduced or zero down payment real estate loan, reduced price and/or financing for cars, traveling and/or vacationing at reduced cost or for free;

wherein the entity pays to receive the benefit;

wherein the benefit provider pays when the benefit is utilized.

16. The web-enabled mobile device of claim 15, wherein a map and/or directions to the benefit provider is displayed on the GUI.

17. The web-enabled mobile device of claim 15, wherein a notification of the modification of, impending modification to, update of, change to, elimination of, or pending elimination of the benefit; or the availability of or pending availability of a new benefit; is sent to the web-enabled mobile device.

18. The web-enabled mobile device of claim 15, wherein the benefit is discontinued being displayed on the GUI as a result of the web-enabled device no longer being in physical proximity to the benefit provider.

19. The web-enabled mobile device of claim 15, wherein, as the result of one or more changes to the entity's demographic and/or psychographic criteria data, a different benefit is displayed on the GUI.

20. The web-enabled mobile device of claim 15, wherein physical proximity is determined by comparing the location of the benefit provider with the location of the entity, entity location provided by entity.

21. The web-enabled mobile device of claim 15, wherein physical proximity is determined using a wireless local area network (WLAN).

22. The web-enabled mobile device of claim 15, wherein, at least in part as the result of the web-enabled mobile device coming into the physical proximity of a different benefit provider, a different benefit is displayed on the GUI; wherein physical proximity is determined using a WLAN.

23. A computer program product stored on a computer readable medium including executable instructions that when executed by at least one processor performs functions comprising: maintaining a database for benefit providers, said database including: at least one benefit listing, where the benefit listing includes at least one demographic and/or psychographic criteria factor; payment history and listing history of the benefit provider; modifying the benefit listing of the benefit provider upon receiving, via a network, a modification request;

wherein the demographic and/or psychographic criteria factor(s) include at least one from the group consisting of: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population;
wherein the benefit is offered to one or more entities meeting the specified qualifications and eligibility requirements as established by the benefit provider;
wherein the benefit offered by the benefit provider is from the group consisting of: rebate, voucher, certificate, discount, giveaway, free premium, free merchandise, grant, bonus, award, free or reduced cost legal advice and/or services, reduced interest-rate real estate financing, reduced or zero down payment real estate loan, reduced price and/or financing for cars, traveling and/or vacationing at reduced cost or for free;
wherein the benefit provider is notified of the acceptance(s) of the benefit.

24. A benefit system comprising: at least one processor and one graphical user interface (GUI); and at least one non-transitory computer readable storage medium storing instructions thereon that, when executed by the at least one processor, cause the system to in real or near real time:
   determine that a web-enabled mobile device associated with a user is within physical proximity of a benefit provider;
   post a benefit from the benefit provider to the GUI of the web-enabled mobile device;
   wherein the benefit is offered to the user as a result of the user meeting the specified qualification(s) and eligibility requirement(s) as established by the benefit provider;
   wherein the benefit is from the group consisting of: rebate, voucher, certificate, discount, giveaway, free premium, free merchandise, grant, bonus, award, free or reduced cost legal advice and/or services, reduced interest-rate real estate financing, reduced or zero down payment real estate loan, reduced price and/or financing for cars, traveling and/or vacationing at reduced cost or for free;
   wherein physical proximity is determined using a wireless local area network (WLAN);
   wherein the benefit provider is notified of the acceptance(s) of the benefit.

25. The benefit system of claim 24, wherein the benefit provider pays each time the benefit is utilized.

26. The benefit system of claim 24, wherein the user qualifies for either an improvement in the terms and/or conditions of the benefit; or for at least one additional benefit; through the aggregation of the user with at least one additional user.

27. The benefit system of claim 24, wherein a benefit application form is posted to the GUI of the web-enabled mobile device.

28. The benefit system of claim 24, wherein a map and/or directions to the benefit provider is/are posted to the GUI.

29. The benefit system of claim 24, further comprising the availability of a communication connection between the benefit provider and the web-enabled mobile device.

30. The benefit system of claim 24, wherein the posted benefit is received into the system directly via a network.

31. The benefit system of claim 24, wherein the posted benefit is received into the system from a third-party intermediary acting on behalf of the benefit provider via a network.

32. The benefit system of claim 24, wherein the posted benefit is printable.

33. A computing system comprising:
   a device containing a graphical user interface (GUI);
   a memory;
   a processor;
   an Internet communication link;
   the processor to provide a selected benefit to the GUI;
   wherein the benefit is selected based at least in part on the physical proximity of the device to a benefit provider;
   wherein the benefit is offered to a user as a result of the user meeting the specified qualification(s) and eligibility requirement(s) as established by the benefit provider;
   wherein the benefit is from the group consisting of: rebate, voucher, certificate, discount, giveaway, free premium, free merchandise, grant, bonus, award, free or reduced cost legal advice and/or services, reduced interest-rate real estate financing, reduced or zero down payment real estate loan, reduced price and/or financing for cars, traveling and/or vacationing at reduced cost or for free;
   wherein the benefit provider is notified of the acceptance of the benefit by the user;
   wherein physical proximity is determined using a WLAN.

34. The computing system of claim 33, further comprising the processor providing to the GUI a map and/or directions to the benefit provider.

35. The computing system of claim 33, wherein an audible message concerning the benefit is delivered.

36. The computing system of claim 33, wherein, as the result of one or more changes to an entity's demographic and/or psychographic criteria data, a different selected benefit is provided to the GUI.

37. The computing system of claim 33, wherein, as the result of the computing device coming into the physical proximity of a different benefit provider, a different selected benefit is provided to the GUI.

38. The computing system of claim 33, wherein the benefit provider pays when the benefit is utilized.

39. A system comprising:
   at least one graphical user interface (GUI);
   at least one central processing unit (CPU) processor;
   a database or server that maintains benefit messages downloaded by users of one or more mobile web-enabled devices;
   an Internet communication link;
   at least one storage device in communication with the at least one CPU processor, the at least one storage device including instructions that, when executed by the at least one CPU processor, enable the performance of a CPU executed method comprising:
      storing in the at least one storage device a cost amount for each of one or more benefit messages;
      presenting, with the at least one CPU processor, at least one benefit message for display on the GUI(s) of one or more mobile web-enabled devices;
      wherein the benefit message(s) is/are selected for GUI display based at least in part on the physical proximity of the one or more mobile web-enabled device(s) to a benefit provider;
      wherein the benefit(s) is/are from the group consisting of: rebate, voucher, certificate, discount, giveaway, free premium, free merchandise, grant, bonus, award, free or reduced cost legal advice and/or services, reduced interest-rate real estate financing, reduced or zero down payment real estate loan, reduced price and/or financing for cars, traveling and/or vacationing at reduced cost or for free;
      wherein the benefit is offered to users as a result of the users meeting the specified qualification(s) and eligibility requirement(s) as established by the benefit provider;

wherein the benefit provider is notified of the acceptance of the benefit by the user(s).

40. The system of claim 39, wherein physical proximity is determined by comparing the location of the benefit provider with the location of the entity as provided by the entity.

41. The system of claim 39, wherein physical proximity is determined using a wireless local area network (WLAN).

42. A benefit system comprising:

receiving in at least one physical memory device and via a network (i) at least a sub-set of an entity's demographic, geographic, and psychographic data, (ii) benefit data for a benefit which is offered to one or more entities meeting the specified qualifications and eligibility requirements as established by a benefit provider, and (iii) the benefit provider's data;

storing in at least one physical memory device (i) the entity's data, (ii) the benefit data, and (iii) the benefit provider's data;

inputting the entity's data, benefit data, and benefit provider's data into a processing device with at least one data entry device in electronic communication with the processing device;

said processing device analyzing at least (i) the entity's data and (ii) the benefit data in real or substantially real time to determine whether the entity qualifies for the benefit provider's benefit;

generating a message to a web-enabled mobile device to inform the entity of the availability of the benefit;

wherein the benefit is from the group consisting of: rebate, voucher, certificate, discount, giveaway, free premium, free merchandise, grant, bonus, award, free or reduced cost legal advice and/or services, reduced interest-rate real estate financing, reduced or zero down payment real estate loan, reduced price and/or financing for cars, traveling and/or vacationing at reduced cost or for free;

wherein the benefit message is generated to the web-enabled mobile device based at least in part on the physical proximity of the web-enabled mobile device to a benefit provider;

wherein a map and/or directions to the benefit provider is generated to the web-enabled mobile device;

wherein the benefit is received into the system from a third-party intermediary acting on behalf of the benefit provider;

wherein the benefit provider incurs a cost for the delivery of their benefit message to the web-enabled mobile device;

wherein the benefit provider is notified of the acceptance of the benefit by the entity;

wherein the entity does not pay for system access and use.

43. The benefit system of claim 42, wherein physical proximity is determined using WLAN; and wherein the benefit has an expiration date.

* * * * *